(12) United States Patent
Josephson

(10) Patent No.: US 11,775,074 B2
(45) Date of Patent: Oct. 3, 2023

(54) APPARATUSES, SYSTEMS, AND/OR INTERFACES FOR EMBEDDING SELFIES INTO OR ONTO IMAGES CAPTURED BY MOBILE OR WEARABLE DEVICES AND METHOD FOR IMPLEMENTING SAME

(71) Applicant: Quantum Interface, LLC, Austin, TX (US)

(72) Inventor: Jonathan Josephson, Austin, TX (US)

(73) Assignee: Quantum Interface, LLC, Austin, TX (US)

( * ) Notice: Subject to any disclaimer, the term of this patent is extended or adjusted under 35 U.S.C. 154(b) by 0 days.

(21) Appl. No.: 16/404,382

(22) Filed: May 6, 2019

(65) Prior Publication Data

US 2019/0391729 A1 Dec. 26, 2019

Related U.S. Application Data

(63) Continuation-in-part of application No. 15/210,832, filed on Jul. 14, 2016.
(Continued)

(51) Int. Cl.
*G06F 3/01* (2006.01)
*H04L 12/28* (2006.01)
(Continued)

(52) U.S. Cl.
CPC ............ *G06F 3/017* (2013.01); *G06F 3/0482* (2013.01); *G06F 3/0485* (2013.01); *G06F 3/04817* (2013.01); *G06F 3/04845* (2013.01); *G06F 3/04847* (2013.01); *G06F 3/04883* (2013.01); *G06F 16/54* (2019.01); *G06T 7/194* (2017.01); *G06T 11/60* (2013.01); *G08C 17/00* (2013.01); *H04L 9/40* (2022.05); *H04L 12/282* (2013.01); *H04L 12/2803* (2013.01); *H04L 67/51* (2022.05); *H04L 67/52* (2022.05); *H04L 67/75* (2022.05); *H04N 5/265* (2013.01); *G06T 2200/24* (2013.01); *G08C 2201/32* (2013.01);
(Continued)

(58) Field of Classification Search
CPC ..... G06T 7/194; G06T 11/60; G06T 2200/24; G06F 3/04817; G06F 3/0482; G06F 3/04845; G06F 3/0485; G06F 16/54; H04N 5/265
See application file for complete search history.

(56) References Cited

U.S. PATENT DOCUMENTS 7,831,392 B2   11/2010   Josephson et al.
7,861,188 B2   12/2010   Josephson et al.
(Continued)

FOREIGN PATENT DOCUMENTS

EP   1717666 A1 *  11/2006   ............. H04L 67/52
JP   08077337 A *   3/1996   ............... G06T 3/00
(Continued)

*Primary Examiner* — Ryan R Yang
(74) *Attorney, Agent, or Firm* — Robert W. Strozier

(57) ABSTRACT

Systems, apparatuses and interfaces and methods for implementing same including a mobile device having a camera system, where the systems, apparatuses, interfaces, and methods capture an image and embed the image into a background image selected from a group of background images generated by the systems, apparatuses, interfaces, and methods based on a location, a surroundings and an environment.

20 Claims, 10 Drawing Sheets

Related U.S. Application Data

(60) Provisional application No. 62/666,842, filed on May 4, 2018.

(51) Int. Cl.
    *G06F 3/04883*      (2022.01)
    *G06F 3/04847*      (2022.01)
    *G06F 3/0482*      (2013.01)
    *G06F 3/0485*      (2022.01)
    *G08C 17/00*      (2006.01)
    *G06T 7/194*      (2017.01)
    *G06F 16/54*      (2019.01)
    *G06F 3/04817*      (2022.01)
    *G06F 3/04845*      (2022.01)
    *G06T 11/60*      (2006.01)
    *H04N 5/265*      (2006.01)
    *H04L 9/40*      (2022.01)
    *H04L 67/51*      (2022.01)
    *H04L 67/52*      (2022.01)
    *H04L 67/75*      (2022.01)
    *H04L 69/329*      (2022.01)
    *H04N 23/90*      (2023.01)

(52) U.S. Cl.
    CPC ...... *H04L 69/329* (2013.01); *H04L 2012/285* (2013.01); *H04N 23/90* (2023.01)

(56) References Cited

U.S. PATENT DOCUMENTS

| | | | |
|---|---|---|---|
| 8,788,966 | B2 | 7/2014 | Josephson et al. |
| 9,703,388 | B2 | 7/2017 | Josephson et al. |
| 9,746,935 | B2 | 8/2017 | Josephson et al. |
| 9,971,492 | B2 | 5/2018 | Chandler et al. |
| 10,263,967 | B2 | 4/2019 | Josephson et al. |
| 10,289,204 | B2 | 5/2019 | Josephson |
| 10,503,359 | B2 | 12/2019 | Josephson |
| 2002/0122072 | A1 | 9/2002 | Selker |
| 2008/0034331 | A1 | 2/2008 | Josephson et al. |
| 2010/0134425 | A1 | 6/2010 | Storrusten |
| 2010/0141784 | A1* | 6/2010 | Yoo .................... H04N 5/2621 348/222.1 |
| 2010/0146376 | A1* | 6/2010 | Reams ............... H04N 7/17318 715/208 |
| 2010/0333030 | A1 | 12/2010 | Johns |
| 2011/0043443 | A1 | 2/2011 | Kawano et al. |
| 2011/0055773 | A1 | 3/2011 | Agarawala et al. |
| 2011/0066981 | A1 | 3/2011 | Chmielewski et al. |
| 2011/0221974 | A1 | 9/2011 | Stern et al. |
| 2011/0289456 | A1 | 11/2011 | Reville et al. |
| 2011/0316888 | A1 | 12/2011 | Sachs et al. |
| 2012/0050157 | A1 | 3/2012 | Latta et al. |
| 2012/0092338 | A1* | 4/2012 | Ogishima ............ H04N 13/275 345/419 |
| 2012/0216143 | A1 | 8/2012 | Shiplacoff et al. |
| 2012/0249310 | A1 | 10/2012 | Hotaling |
| 2013/0021266 | A1* | 1/2013 | Selim .................. G06F 3/04883 345/173 |
| 2013/0104079 | A1 | 4/2013 | Yasui et al. |
| 2013/0135194 | A1 | 5/2013 | Josephson |
| 2013/0135195 | A1 | 5/2013 | Josephson et al. |
| 2014/0160073 | A1* | 6/2014 | Matsuki ................. G06F 3/016 345/173 |
| 2014/0185871 | A1* | 7/2014 | Ito ....................... G06K 9/00671 382/103 |
| 2015/0100578 | A1* | 4/2015 | Rosen ................. G06F 16/9554 707/737 |
| 2015/0135132 | A1 | 5/2015 | Josephson et al. |
| 2016/0041702 | A1* | 2/2016 | Wang .................... G06F 3/0482 715/830 |
| 2016/0320860 | A1 | 11/2016 | Josephson et al. |
| 2017/0061625 | A1* | 3/2017 | Estrada ............... G06N 3/0454 |
| 2017/0139556 | A1 | 5/2017 | Josephson et al. |
| 2017/0180336 | A1 | 6/2017 | Josephson et al. |
| 2017/0269705 | A1 | 9/2017 | Josephson et al. |
| 2018/0324366 | A1* | 11/2018 | Shen ..................... A45D 42/08 |
| 2019/0050427 | A1* | 2/2019 | Wiesel ................. G06F 16/583 |
| 2019/0102924 | A1* | 4/2019 | Albouze ................ G06T 11/60 |

FOREIGN PATENT DOCUMENTS

| | | |
|---|---|---|
| JP | 2010019643 A | 1/2010 |
| JP | 2012068854 A | 4/2012 |
| JP | 2012108842 A | 6/2012 |
| TW | 3182202 A1 * | 6/2017 ............. G03B 15/00 |
| WO | 2007128035 A1 | 11/2007 |
| WO | 2013049864 A1 | 4/2013 |
| WO | 2013095677 A1 | 6/2013 |

\* cited by examiner

APPARATUSES, SYSTEMS, AND/OR INTERFACES FOR EMBEDDING SELFIES INTO OR ONTO IMAGES CAPTURED BY MOBILE OR WEARABLE DEVICES AND METHOD FOR IMPLEMENTING SAME

RELATED APPLICATIONS

This application claims the benefit of and priority to U.S. Provisional Patent Application Ser. No. 62/666,842 filed May 4, 2018, incorporated by operation of last paragraph. This application may also claim the benefit and priority to or are related to U.S. patent application Ser. No.: 16/296,114 filed Mar. 7, 2019; Ser. No. 16/245,206 filed Jan. 10, 2019; Ser. No. 16/148,971 filed Oct. 1, 2018; Ser. No. 15/255,107 filed Sep. 1, 2016; Ser. No. 15/210,832 filed Jul. 14, 2016; Ser. No. 14/731,335 filed Jun. 4, 2015; Ser. No. 14/504,393 filed Oct. 1, 2014; and Ser. No. 14/504,391 filed Jan. 1, 2014, all incorporated by operation of last paragraph.

This application is also related to U.S. patent application Ser. No. 12/978,690 filed Dec. 27, 2010, now U.S. Pat. No. 8,788,966 issued Jul. 22, 2014, U.S. Pat. No. 11/891,322 filed Aug. 9, 2007, now U.S. Pat. No. 7,861,188 issued Dec. 28, 2010, and U.S. Pat. No. 10/384,195 filed Mar. 7, 2003, now U.S. Pat. No. 7,831,932 issued Nov. 9, 2010, all incorporated by operation of last paragraph.

BACKGROUND OF THE DISCLOSURE

1. Field of the Disclosure

Embodiments of the present disclosure relate to systems, apparatuses and interfaces and methods implementing them, wherein the systems, apparatuses and interfaces include a mobile device having a front facing camera and optionally a rear facing camera, where when the front facing camera is activated to capture an image of the user, the mobile device acquires or captures information including one or more environmental triggers from the image of the front facing camera or optionally from the rear facing camera and generates and displays a list of backgrounds, images or virtual objects or elements onto or into which the user's image from the front facing camera may be embedded, wherein the backgrounds may include a real or virtual person, real or virtual people, a real or virtual place, real or virtual places, a real or virtual thing or real or virtual things, a real or virtual animal or real or virtual animals, a real or virtual plant or real or virtual plants, a real or virtual object, real or virtual objects, or combinations thereof and wherein the background selection may be based on motion based processing. Each of the objects or elements, or combinations of these, may be manipulated and configured to create different positions relative to the display and each other, and the characteristics of all objects and environments may be altered as well.

2. Description of the Related Art

There is still a need in the art for improved systems, apparatuses and interfaces and methods for implementing the same for embedding images into environments.

SUMMARY OF THE DISCLOSURE

Embodiments of this disclosure provide systems, apparatuses, and/or interfaces including a mobile and/or wearable device including a front facing camera and/or a rear facing camera, a display or other user feedback device, a processing unit, optionally a motion sensor, a speaker, a microphone, and optionally an input device such as eye tracking device, head tracking device, or other detached input device. The systems, apparatuses, and/or interfaces also includes an application resident on the systems, apparatuses, and/or interfaces. The application is configured to activatee a front facing camera and to capture an image of the user, a selfie. The application is also configured to acquire or capture surroundings image information including one or more environments, preset, predefined, and/or configured triggers from the surroundings image information from the front facing camera and/or rear facing camera. The application is also configured to generate and to display a list of backgrounds onto or into which the selfie may be embedded, wherein the backgrounds may include a real environment or a virtual environment, real or virtual people, a real or virtual place, a real or virtual thing or things, a real or virtual animal or animals, a real or virtual plant or plants, a real or virtual object or objects, or combinations thereof The application is also configured to select a particular background using either motion based processing or hard select processing. The application is also configured to process the selfie so that only the image of the person or persons remain. The application is also configure to dynamically, according to preset or predefined preferences or manually position the processed selfie into or onto the background. The application is also configured to generate and store the resulting image in an image storage database on the mobile or wearable devices. In certain embodiments, the application may also be configured to retrieve a set of precaptured selfies from the image database and display the precaptured selfies in a scrolling area so that one or more selfies may be selected using either motion based processing or hard select processing.

Embodiments of this disclosure provide methods for implementing the systems, apparatuses and/or interfaces including a mobile and/or wearable device including a front facing camera and/or a rear facing camera, a display or other user feedback device, a processing unit, optionally a motion sensor, a speaker, a microphone, and optionally an input device such as eye tracking device, head tracking device, or other detached input device. The methods include installing the selfie embedding application on the mobile or wearable device and generating an icon representing the application for display in the icon display regions of the mobile or wearable device. The methods also include selecting and activating the application icon using either motion based processing or hard select processing. The methods also include activating the front facing camera and acquiring or capturing a selfie or displaying a plurality of precaptured selfies in a precaptured selfie scroll area and selecting one or more selfies from the precapatured selfies using either motion based processing or hard select processing. The methods also include processing the selfie to remove all image data other than an image of the people in the image remove all background image data. The methods also include activating the rear facing camera and/or the front camera and capturing surroundings image information or data including environmental data, preset data, predefined data, and/or configured trigger data from the surroundings image information or data captured from the front facing camera and/or rear facing camera. The methods also include generating and displaying a list or plurality of backgrounds as a selectable icon or icons in a display area of the display device, wherein the backgrounds may include a real environment or a virtual environment, real or virtual people, a real or virtual place, a real or virtual thing or things, a real or virtual animal or animals, a real or virtual plant or plants, a real or virtual object or objects, or combinations thereof. The methods also include selecting the a particular background from the background icons using either motion based processing or hard select processing. The methods may also include manipulating elements of the selected background to form a modified background before selfied embedding. The methods also include embedding the processed selfies into or onto the particular background or modified background. The methods also include outputting the image and storing the image in the image database on the device or in a dedicated image database associated with the application.

BRIEF DESCRIPTION OF THE DRAWINGS OF THE DISCLOSURE

The disclosure may be better understood with reference to the following detailed description together with the appended illustrative drawings in which like elements are numbered the same:

DEFINITIONS USED IN THE DISCLOSURE

Figure 1A:
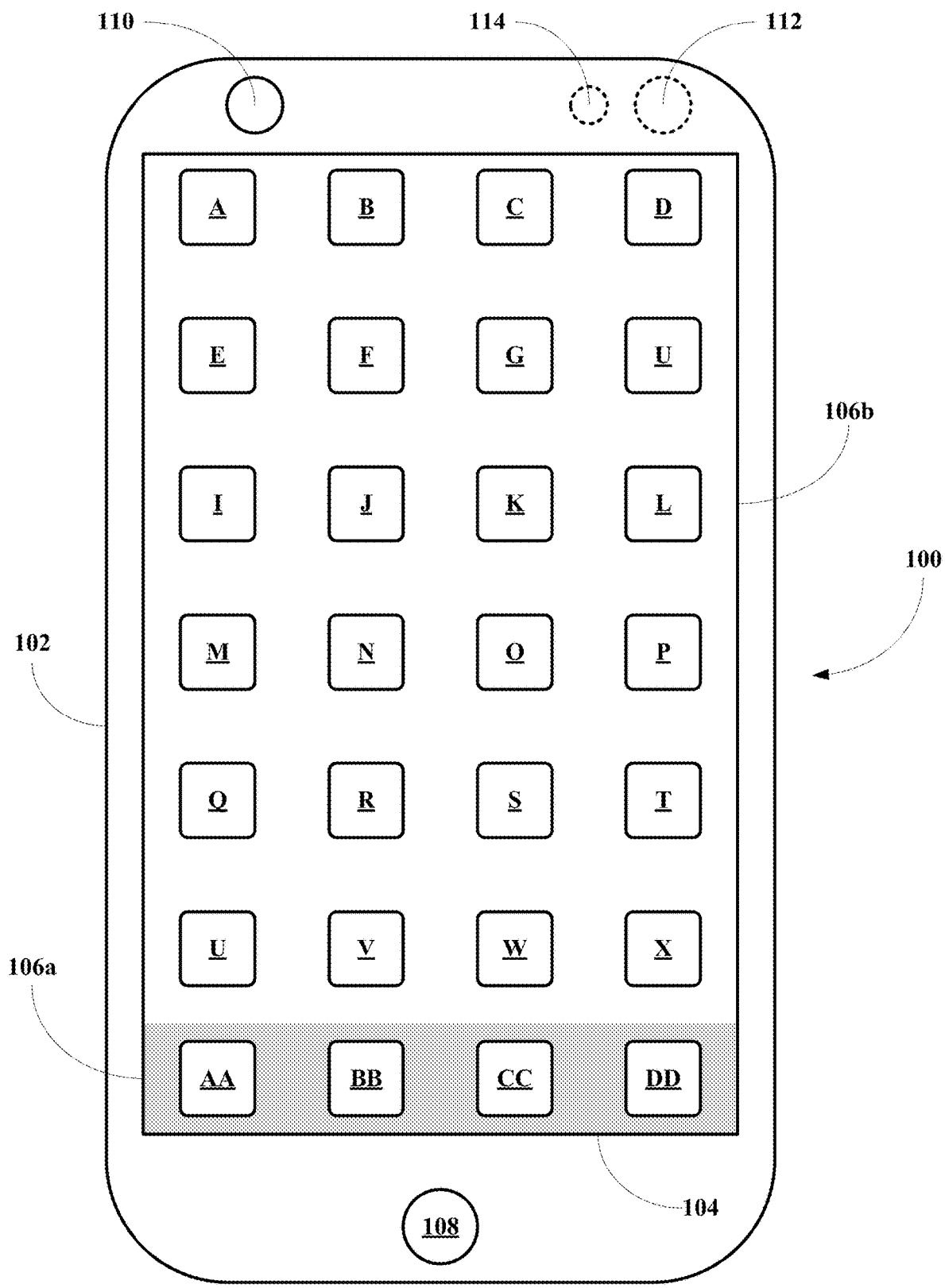
FIG. 1A depicts a mobile device (here a cell phone) displaying a plurality of selectable icons and a plurality of persistent selectable icons in a persistent region.

The term "at least one" means one or more or one or a plurality, additionally, these three terms may be used interchangeably within this application. For example, at least one device means one or more devices or one device and a plurality of devices.

The term "one or a plurality" means one thing or a plurality of things.

The term "about" or "approximately" means that a value of a given quantity is within ±20% of the stated value. In other embodiments, the value is within ±15% of the stated value. In other embodiments, the value is within ±10% of the stated value. In other embodiments, the value is within ±5% of the stated value. In other embodiments, the value is within ±2.5% of the stated value. In other embodiments, the value is within ±1% of the stated value.

The term "substantially" or 'essentially" means that a value of a given quantity is within±5% of the stated value. In other embodiments, the value is within ±2.5% of the stated value. In other embodiments, the value is within ±2% of the stated value. In other embodiments, the value is within ±1% of the stated value. In other embodiments, the value is within ±0.1% of the stated value.

The term "motion" and "movement" are often used interchangeably and mean motion or movement that is capable of being detected by a motion sensor within an active zone of the sensor. Thus, if the sensor is a forward viewing sensor and is capable of sensing motion within a forward extending conical active zone, then movement of anything within that active zone that meets certain threshold detection criteria, will result in a motion sensor output, where the output may include at least direction, velocity, and/or acceleration. The motion may be of the sensor itself, or any combination of sensors moving, motion within sensing zones, or any combination or numbers of these. Of course, the sensors do not need to have threshold detection criteria, but may simply generate output anytime motion or any kind is detected. The processing units can then determine whether the motion is an actionable motion or movement and a non-actionable motion or movement.

The term "motion sensor" or "motion sensing component" means any sensor or component capable of sensing motion of any kind by anything with an active zone area or volume, regardless of whether the sensor's or component's primary function is motion sensing.

The term "real object" or "real-world object" means any real-world device or article that is capable of being controlled by a processing unit. Real objects include objects or articles that have real-world presence including physical, mechanical, electro-mechanical, magnetic, electro-magnetic, electrical, or electronic devices or any other real-world device that can be controlled by a processing unit.

The term "virtual object" means any construct generated in a virtual world or by a computer and displayed by a display device and that are capable of being controlled by a processing unit. Virtual objects include objects that have no real-world presence, but are still controllable by a processing unit. These objects include elements within a software system, product or program such as icons, list elements, menu elements, generated graphic objects, 2D, 3D, 4D, or higher dimensional graphic images or objects, generated real-world objects such as generated people, generated animals, generated devices, generated plants, generated landscapes and landscape objects, generate seascapes and seascape objects, generated skyscapes or skyscape objects, or any other generated real-world or imaginary objects.

The term "entity" means a human or an animal or robot or robotic system (autonomous or non-autonomous.

The term "entity object" means a human or a part of a human (fingers, hands, toes, feet, arms, legs, eyes, head, body, etc.), an animal or a port of an animal (fingers, hands, toes, feet, arms, legs, eyes, head, body, etc.), or a real-world object under the control of a human or an animal or a robot and include such articles as pointers, sticks, or any other real-world object that can be directly or indirectly controlled by a human or animal or a robot.

The term "VR" means virtual reality—computer-simulated reality, replicates an environment that simulates a physical presence in places in the real world or an imagined world, allowing the user to interact in that world.

The term "AR" means augmented reality—mixture of real world images and/or objects and virtual images and objects—a live, direct or indirect view of a physical, real-world environment whose elements are augmented (or supplemented) by computer-generated sensory input such as sound, video, graphics or GPS data.

The term "MR" means mixed reality—sometimes referred to as hybrid reality—merges real and virtual worlds to produce new environments and visualizations, where physical and digital objects co-exist and interact in real time.

The term "XR" means X Reality (XR or Cross Reality) consists of technology-mediated experiences that combine digital and/or biological realities. It also stands for any kind of virtual environment that may be coupled with the real-world environment.

The term "time line" means any project, process, story, or other matter or form that involves a sequence of tasks, goals, targets, objectives, processes, routines, targets, events, etc. and/or combinations thereof to be accomplished in a specific order whether temporal or otherwise. These projects, processes, stories, or other matter or forms that occur in a specific sequence are generally referred to as a time line.

DETAILED DESCRIPTION OF THE DISCLOSURE

The inventor has found that systems, apparatuses, interfaces, and methods for implementing same on a mobile device or wearable device, where the systems, apparatuses, or interfaces involve using surroundings to modify selfies so that a user's image may be embedded into preset, predefined, surrounding dependent, and/or environment dependent background or settings. For example, if the user is going to a movie and the surroundings includes posters of the movie or other identifying information about the movie or movies now playing at a theater, then the systems, apparatuses, or interfaces would allow a user image to be embedded into a poster or other images publically available concerning the movie or movies.

Embodiments of the systems, apparatuses, or interfaces include a mobile device or wearable device including a front facing camera and/or a rear facing camera, a display or other user feedback device, a processing unit, optionally integrated one or more motion sensors, one or more speakers, and one or more microphones, and optionally one or more remote input devices such as eye or head tracking devices or other detached input devices. The systems, apparatuses, or interfaces are designed or configured to capture information and/or one or more images from the surroundings imaged by either the front facing camera and/or the rear facing camera. The systems, apparatuses, or interfaces uses the information and/or images to generate a background image or a plurality of background images into which a user selfie may be embedded. The systems, apparatuses, or interfaces then allow the user to select a particular background image using any selection format including motion, clicks, tapping, cursor motion and clicks, gestures, voice commands, or any other select methodology. The systems, apparatuses, or interfaces then embeds the user image into the selected background image. The placement may be user directed or manipulated, preset, or predefined, or dynamically placed based on the information in the selected background image, so that the user may position the user image anywhere within the selected background image. Of course, the systems, apparatuses, or interfaces may also embed more that one selfie image into the background again the user can preset, predefine, or manually manipulate the placement of the selfie in the background image or the systems, apparatuses, or interfaces may dynamically position the selfies based on the information or image information.

The methods for implementing the systems, apparatuses, or interfaces include pointing a mobile device or wearable device including a front facing camera and/or a rear facing camera, a display or other user feedback device, a processing unit, optionally integrated one or more motion sensors, one or more speakers, and one or more microphones, and optionally one or more remote input devices such as eye or head tracking devices or other detached input devices at a surrounding and capturing an image of the surrounding and analyzing the image to generate one background or a plurality of background images into which a selfie may be embedded. The methods also include selecting a particular background from the generated images using any selection procedure including motion based selecting, gesture based selecting, touching, clicking, speaking, input from an input device in communication with the mobile or wearable device. The methods also include embedding an selfie into the particular background, where the placement may be user directed or manipulated, preset, or predefined so that the user can position the user image any where within the background image. The methods also include capturing the image.

SUITABLE COMPONENTS FOR USE IN THE DISCLOSURE

The motion sensing devices or motion sensors may also be used in conjunction with displays, keyboards, touch pads, touchless pads, sensors of any type, pens, pencils, remotes, or other devices associated with a computer, a notebook computer or a drawing tablet or any mobile or stationary device. The motion sensors may be optical sensors, acoustic sensors, thermal sensors, optoacoustic sensors, any other sensor or combination of sensors that senses movement or changes in movement, or mixtures or combinations thereof. The sensors may be digital, analog or a combination of digital and analog. For camera systems, the systems may sense motion within a zone, area or volume in front of the lens. Optical sensors may operate in any region of the electromagnetic spectrum including, without limitation, RF, microwave, near IR, IR, far IR, visible, UV or mixtures or combinations thereof. Acoustic sensor may operate over the entire sonic range which includes the human audio range, animal audio ranges, or combinations thereof. EMF sensors may be used and operate in any region of a discernable wavelength or magnitude where motion can be discerned. Moreover, LCD screen(s) may be incorporated to identify which devices are chosen or the temperature setting, etc. Moreover, the interface may project a virtual control surface and sense motion within the projected image and invoke actions based on the sensed motion. The motion sensor associated with the interfaces of this invention can also be acoustic motion sensor using any acceptable region of the sound spectrum. A volume of a liquid or gas, where a user's body part or object under the control of a user may be immersed, may be used, where sensors associated with the liquid or gas can discern motion. Any sensor being able to discern differences in transverse, longitudinal, pulse, compression or any other waveform could be used to discern motion and any sensor measuring gravitational, magnetic, electro-magnetic, or electrical changes relating to motion or contact while moving (resistive and capacitive screens)

could be used. Of course, the interfaces can include mixtures or combinations of any known or yet to be invented motion sensors.

Suitable electrical devices, hardware devices and/or appliances capable of being controlled by the control systems and/or switches of this invention, include, without limitation, any electrical and/or hardware device or appliance having attributes which can be controlled by a switch, a joy stick or similar type controller, or software program(s) and/or object(s) and/or elements, objects and attributes, and/or attributes. Exemplary examples of such attributes include, without limitation, ON, OFF, intensity and/or amplitude, impedance, capacitance, inductance, software attributes, lists or submenus of software programs or objects, virtual and/or real objects in a display, mobile device or gaming system, or any other controllable electrical and/or electro-mechanical function and/or attribute of the device. Exemplary examples of electrical devices and/or appliances include, without limitation, environmental controls, building systems and controls, lighting devices such as indoor and/or outdoor lights or light fixtures, cameras, ovens (conventional, convection, microwave, and/or etc.), dishwashers, stoves, sound systems, mobile devices, display systems (TVs, VCRs, DVDs, cable boxes, satellite boxes, and/or etc.), alarm systems, control systems, energy management systems, medical devices, robots, robotic control systems, UAV, equipment and machinery control systems, hot and cold water supply devices, air conditioning system, heating systems, ventilation systems, air handling systems, security systems, computers and computer systems, chemical plant control systems, manufacturing plant control systems, satellite control systems, computer operating systems and other software systems, objects or programs, remote control systems, or the like or mixtures or combinations thereof.

Suitable systems that are amenable to control by the interface of this invention include, without limitation, any analog or digital processing unit or units having single or a plurality of software products installed thereon and where each software product has one or more adjustable attributes associated therewith, or singular software programs or systems with one or more adjustable attributes, menus, lists or other functions or display outputs. Exemplary examples of such software products include, without limitation, operating systems, graphics systems, business software systems, word processor systems, business systems, online merchandising, online merchandising systems, purchasing and business transaction systems, Kiosks and educational or informational systems, databases, software programs and applications, internet browsers, accounting systems, inventory systems, inventory display systems, military systems, control systems, VR systems, AR systems, MR systems, XR systems, or the like, or mixtures or combinations thereof.

Suitable digital processing units (DPUs) include, without limitation, any digital processing unit capable of accepting input from a singular or plurality of devices, touches, or objects and converting at least some of the input into output designed to select and/or control attributes of one or more of the devices or objects. Exemplary examples of such DPUs include, without limitation, microprocessor, microcontrollers, or the like manufactured by Intel, Motorola, Erricsson, HP, Samsung, Hitachi, NRC, Applied Materials, AMD, Cyrix, Sun Microsystem, Philips, National Semiconductor, Via Electonics, Qualcomm, or any other manufacture of microprocessors or microcontrollers.

Suitable analog processing units (APUs) include, without limitation, any analog processing unit capable of accepting input from a singular or a plurality of devices, touches, or objects and converting at least some of the input into output designed to control attributes of one or more of the devices or objects. Such analog devices are available from manufacturers such as Analog Devices Inc.

Suitable display devices include, without limitation, cathode ray tube display (CRT) devices, light-emitting diode display (LED) devices, electroluminescent display (ELD) devices, electronic paper (E Ink) devices, plasma display panel (PDP) devices, liquid crystal display (LCD) devices, organic light-emitting diode display (OLED) devices, projection devices, rear projection devices, holographic devices, other devices for displaying information in 2D, 3D, or 4D.

Suitable motion sensing apparatus include, without limitation, motion sensors of any form such as digital cameras, optical scanners, optical roller ball devices, touch pads, inductive pads, capacitive pads, holographic devices, laser tracking devices, thermal devices, EMF sensors, wave form sensors, any other device capable of sensing motion, changes in EMF, changes in wave form, or the like or arrays of such devices or mixtures or combinations thereof.

Suitable VR/AR/MR input devices include, without limitation, motion sensing devices, tracker devices such as head tracking devices, eye tracking devices, body part tracking devices, gloves, body suits, etc. The tracker devices may be magnetic, optical, acoustic, mechanical, inertial, etc., data glove devices such as optical fiber gloves, mechanical gloves, resistance gloves, optical gloves, microphone devices, devices of acquisition of 3D models, 2 DOF devices, 3-6 DOF devices, kinetic devices such as Microsoft® Kinect®, image sensing devices, depth sensing devices, haptic devices, any other devices for supplying input to control objects in 2D, 3D, and/or 4D, and combinations thereof.

Suitable mobile devices include, without limitation, cell phones, tablets, or nay other mobile devices including a digital or analog processing unit disclosed herein.

Suitable wearable devices include, without limitation, watches, arm bands, flexible wearable devices, or any other wearable device that includes a digital or analog processing unit disclosed herein.

DETAILED DESCRIPTION OF DRAWINGS OF THE DISCLOSURE

Referring now to FIG. 1A, a cell phone (an example of a mobile or wearable device), generally 100, is shown to include a housing 102, a touch screen display 104, a persistent icon area 106a, a dynamic icon area 106b, a start button 108, a front facing camera 110, an optional rear facing camera 112, and a light sensor 114. The display 104 is shown to include a plurality of dynamic application icons A-X in the dynamic icon area 106b and a plurality of persistent icons AA-DD in the persistent icon area 106a.

Figure 1B:
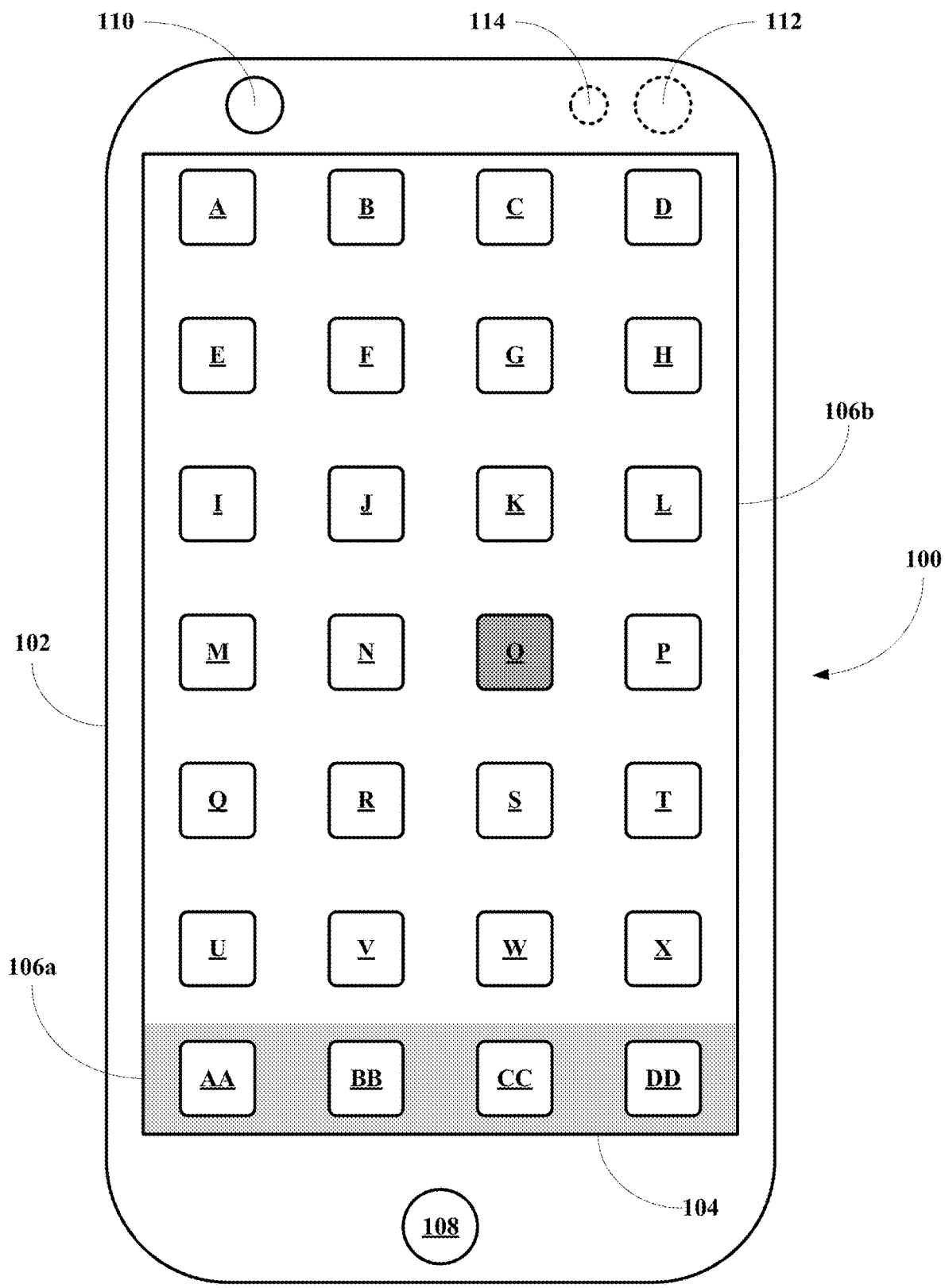
FIG. 1B depicts the mobile device of FIG. 1A showing selection by motion, verbal or other selection means, of the icon representing an embedding application of this disclosure of the mobile device, which opens the camera application resident on the device.

Referring now to FIG. 1B, the front facing camera 110 (or ifpresent the rear facing camera 112) senses a first motion or movement of a stylus or body part or the display 104 senses a first motion or movement of the stylus or body part in contact with the display 104 in the dynamic icon area 106b. The sensed first motion/movement causes the systems, apparatus, or interfaces to scroll through the icons A-X highlighting them in a sequence (any sequence). The front facing camera 110 (or if present the rear facing camera 112) then senses a second motion/movement of the stylus or body part or the display 104 senses a second motion/movement of the stylus or body part in contact with the display 104, wherein the second motion/movement is sufficiently distinct from the first motion/movement to cause the systems, apparatus, or interfaces to select and activate a particular icon, here icon O corresponding to the embedding icon corresponding to the embedding application of this disclosure, which in turn open a camera application resident on the device. Alternatively, the icon selection may be via audible command, touch, or other means may occur to select and activate the camera application. By sufficiently distinct the inventor means that the second motion/movement differs sufficiently from the first motion/movement in at least one attribute, wherein the attributes including direction, speed, velocity, acceleration, magnitude of acceleration, or changes in any of these properties. If the camera icon is in the persistent area 106a, then the same events occur but within the persistent area 106a.

Figure 1C:
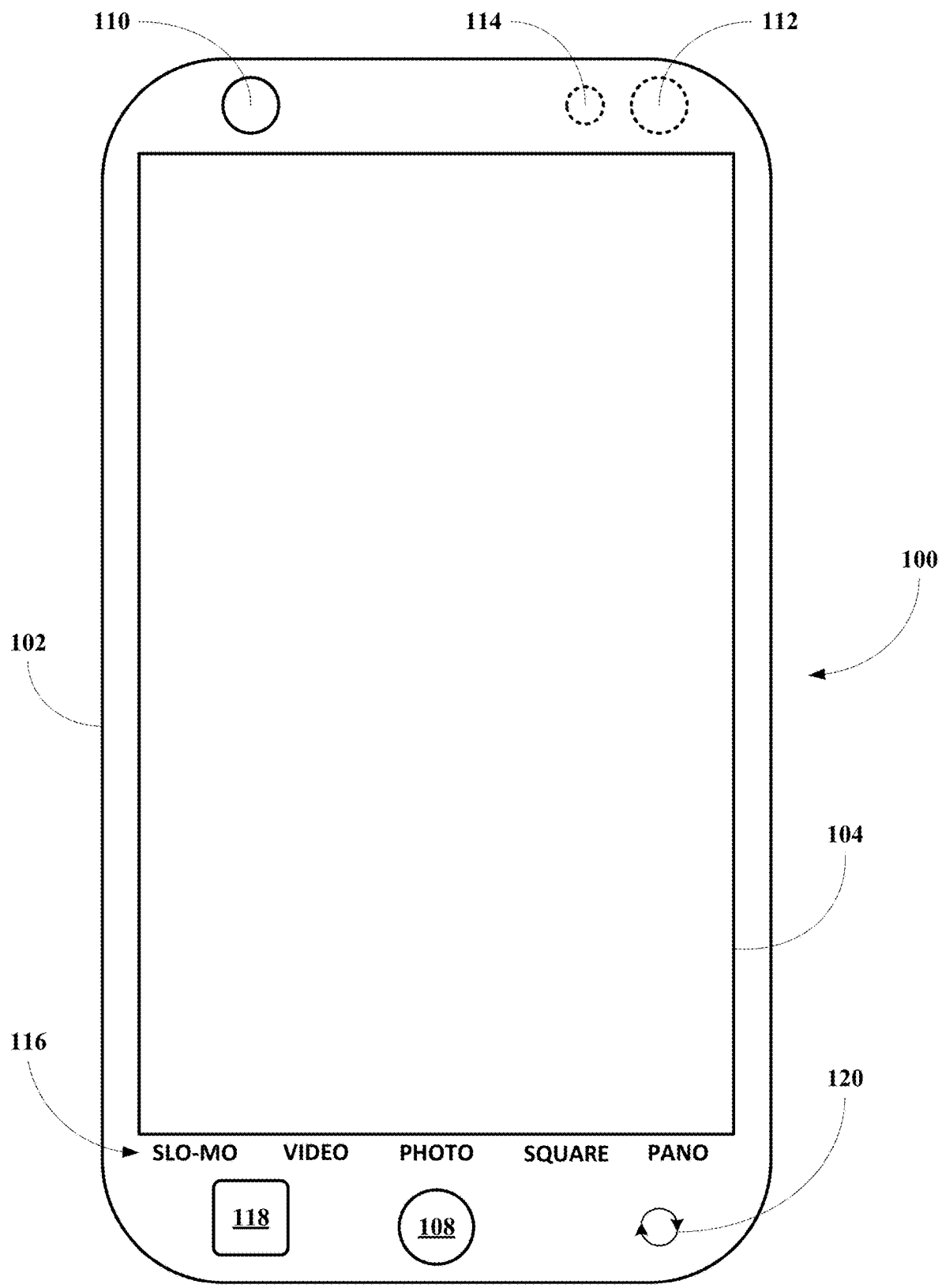
FIG. 1C depicts the mobile device of FIG. 1A with the camera application opened and activatee via selection of the embedding icon.

Referring now to FIG. 1C, once the embedding application icon O is selected and activated, which in turn activates the camera application, the display 104 is cleared and a sliding menu region 116 including menu items SLO-MO, VIDEO, PHOTO, SQUARE, and PANO. The menu region 116 may be touched and slid to reveal additional photo capture formats. Activation of the application icon O also causes the systems, apparatus, or interfaces to display a field 118 in which thumbnail versions of captured material may be viewed, with the last photo occupying the field 118, but other thumbnail photos may be viewed by moving over the field 118. Activation of the application icon O also causes the systems, apparatus, or interfaces to display a camera toggle 120 for switching between the front facing camera 108 and the rear facing camera 112 or other cameras if the mobile device include additional cameras. The SLO-MO icon mean slow motion video; the PHOTO icon means a single image capture, which may include some video components; the SQUARE icon means single square image capture, which may include some video components; and the PANO icon means a panorama image capture, which may include some video components.

Figure 1D:
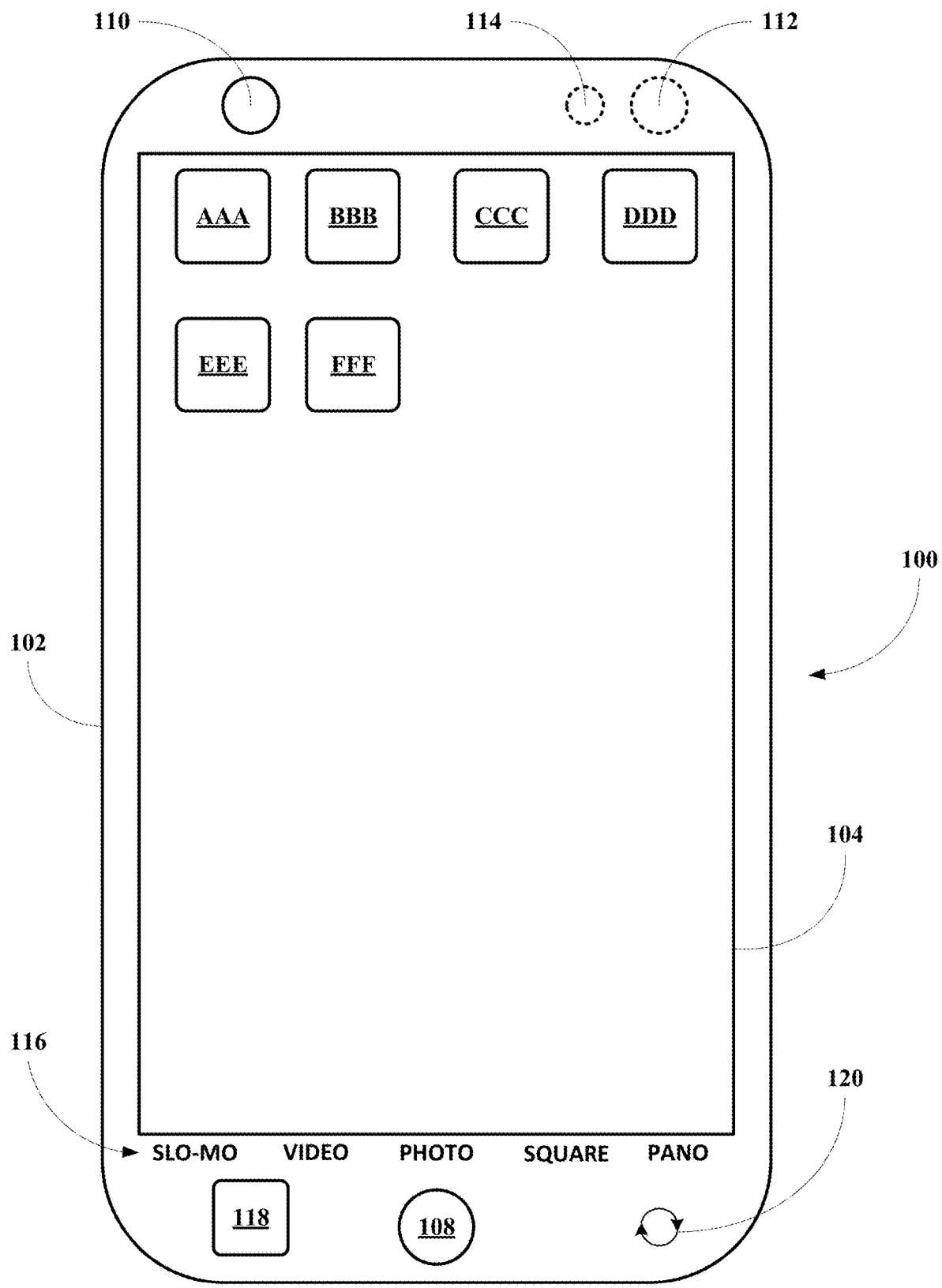
FIG. 1D depicts the mobile device of FIG. 1A, wherein a plurality of selectable background icons are displayed having been determine from a location, a surroundings, or an environment captured by a front and/or rear facing camera.

Referring now to FIG. 1D, now that the application has been selected and activated, the systems, apparatus, or interfaces analyzes captured material (photos and/or videos) and generates one background icon or a plurality of background icons into which a selfie may be embedded. Here the systems, apparatus, or interfaces generate a plurality of background icons AAA-HHH. These backgrounds AAA-HHH may be scenes from a movie, scenes including specific people, scenes including specific environments (mountains, oceans, space, etc.), or any other scene that may be derived from the captured material from the front and/or rear cameras, any combination of the captured material or from other cameras and/or sensors. These images may include specific triggers or specific objects that are used by the systems, apparatus, or interfaces to generate the backgrounds or to position one or more selfies into or onto the backgrounds. For example, if the image contains a movie poster or other event signage, then the systems, apparatus, or interfaces may generate backgrounds including images of the poster or signage. For example, if the image is a video containing a movie poster or other event signage, then the systems, apparatus, or interfaces may generate background videos including videos including the poster or signage.

Figure 1E:
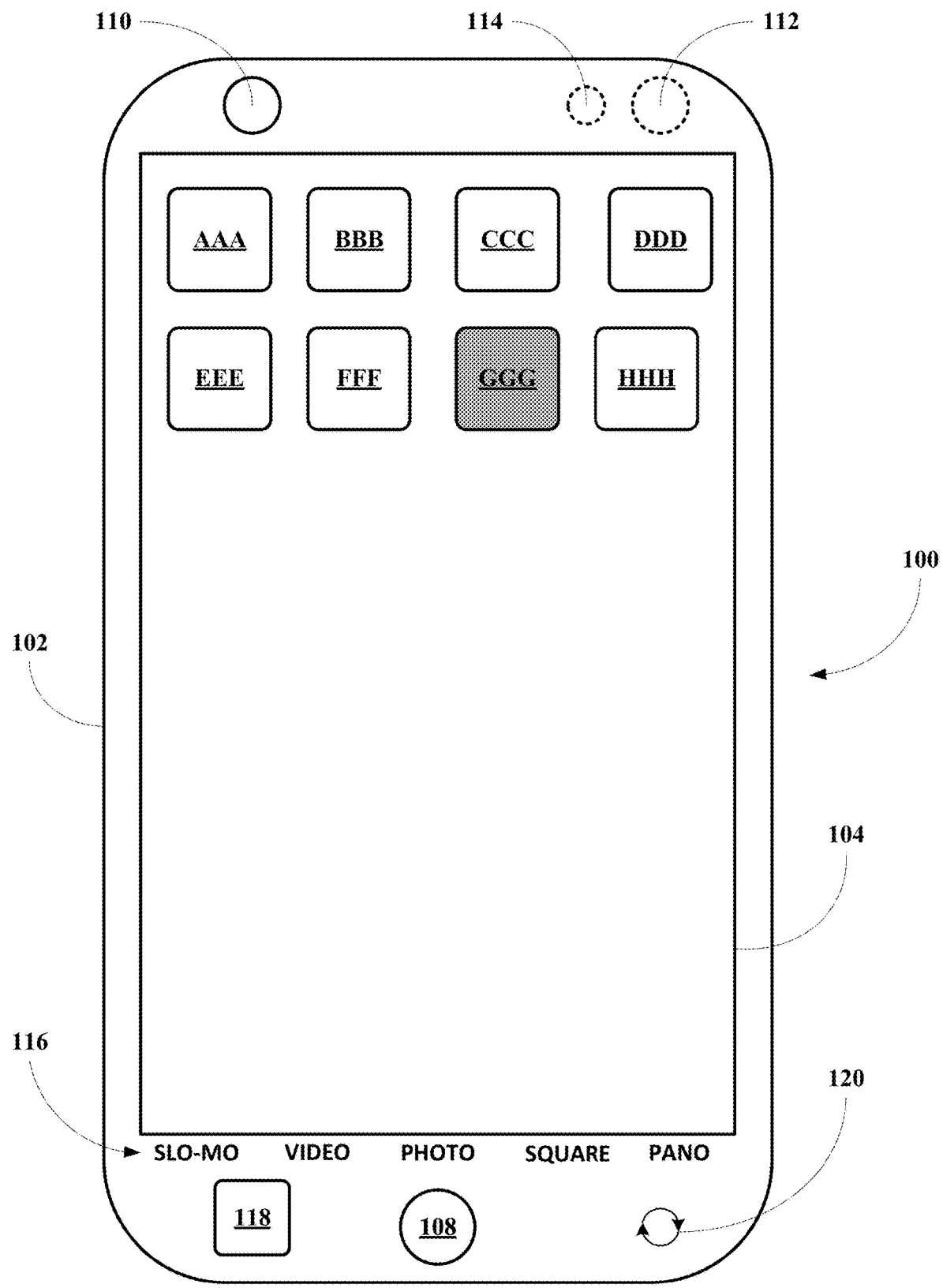
FIG. 1E depicts the mobile device of FIG. 1A showing selection by motion or other means of a particular background icon.

Referring now to FIG. 1E, once the display 104 has been populated with the background icons AAA-HHH, then the front facing camera 110 (or if present the rear facing camera 112) senses a first motion or movement of a stylus or body part or the display 104 senses a first motion or movement of the stylus or body part in contact with the display 104. The sensed first motion/movement or other selection/activation technique, causes the systems, apparatus, or interfaces to scroll through the icons AAA-HHH highlighting them in a sequence (any sequence). The front facing camera 110 (or if present the rear facing camera 112) then senses a second motion/movement of the stylus or body part, or other selection/activation technique, or the display 104 senses a second motion/movement of the stylus or body part in contact with the display 104, wherein the second motion/movement is sufficiently distinct from the first motion/movement to cause the systems, apparatus, or interfaces to select and activate a particular icon, here background icon GGG.

Figure 1F:
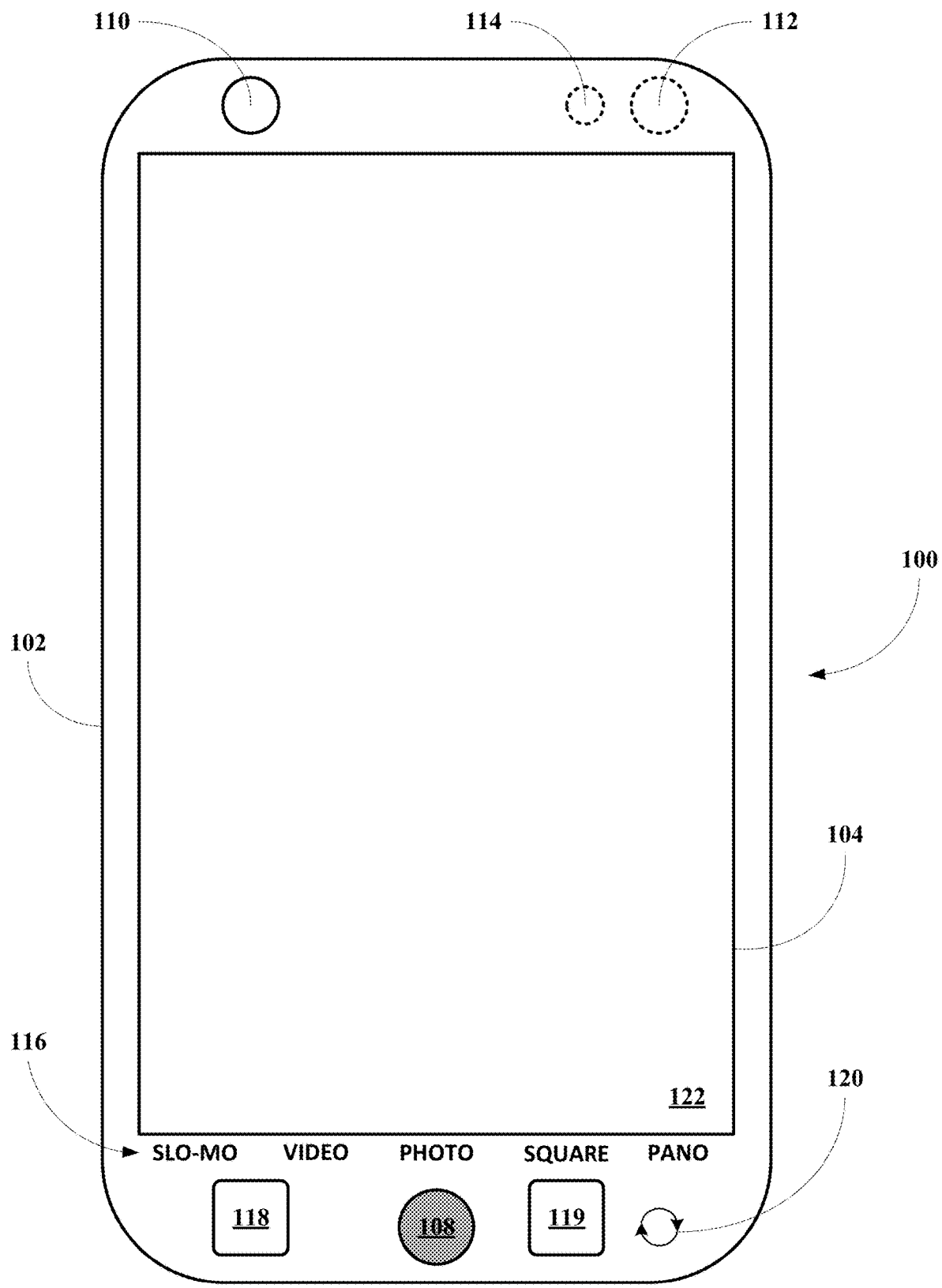
FIG. 1F depicts the mobile device of FIG. 1A showing the capture of a selfie image.

Referring now to FIG. 1F, once selected, the display 104 is cleared and a selfie 122 is taken by pressing the button 108. It should be recognized that while this embodiment is illustrated involves pressing a button, the selection/activation of the camera may occur by any technique known in the art including voice command, motion, touching, lift off, or the like. In another embodiments, the selfie may be a saved selfie that may be selected from a selfie thumbnail field 119.

Figure 1G:
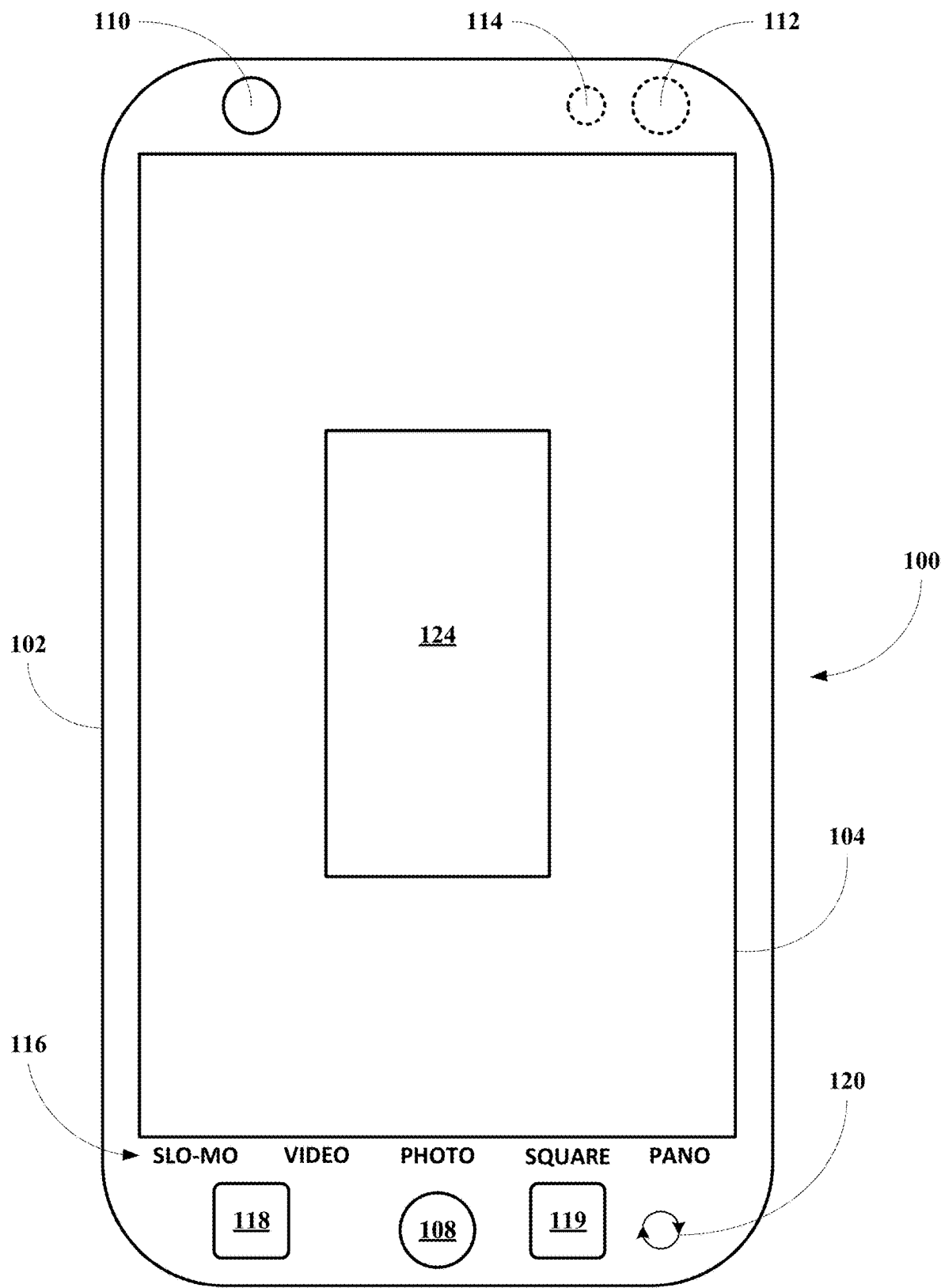
FIG. 1G depicts the mobile device of FIG. 1A showing the extraction of the person capture in the selfie of FIG. 1F.

Referring now to FIG. 1G, once the systems, apparatus, or interfaces captures the selfie 122 or a selfie is selected from the selfie thumbnail field 119, the systems, apparatus, or interfaces extract only the image of the user from the selfie 122 to generate an image extract 124, now shown in the display 104. The systems, apparatus, or interfaces may dynamically position the selfie within the background or the selfie 124 may be moved by the user within the background. If the background is a video, then systems, apparatus, or interfaces may dynamically position the selfie within the background video or the selfie 124 may be moved by the user within the background video on a frame by frame basis.

Figure 1H:
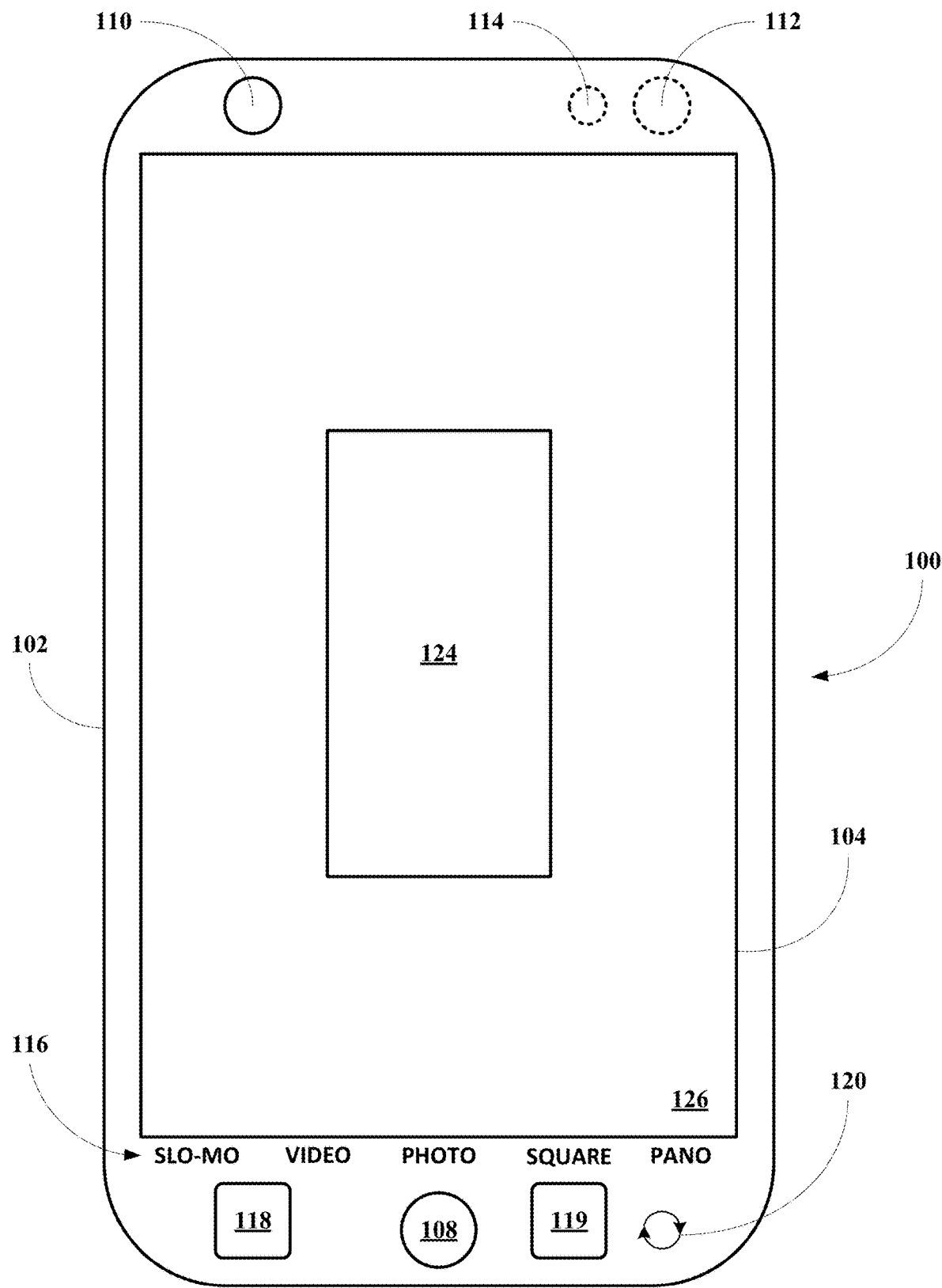
FIG. 1H depicts the mobile device of FIG. 1A showing the embedding of the extracted image into the selected background.

Referring now to FIG. 1H, once the image extract 124 has been generated, the systems, apparatus, or interfaces embeds the image extract 124 into background 126 at the particular position.

Figure 1I:
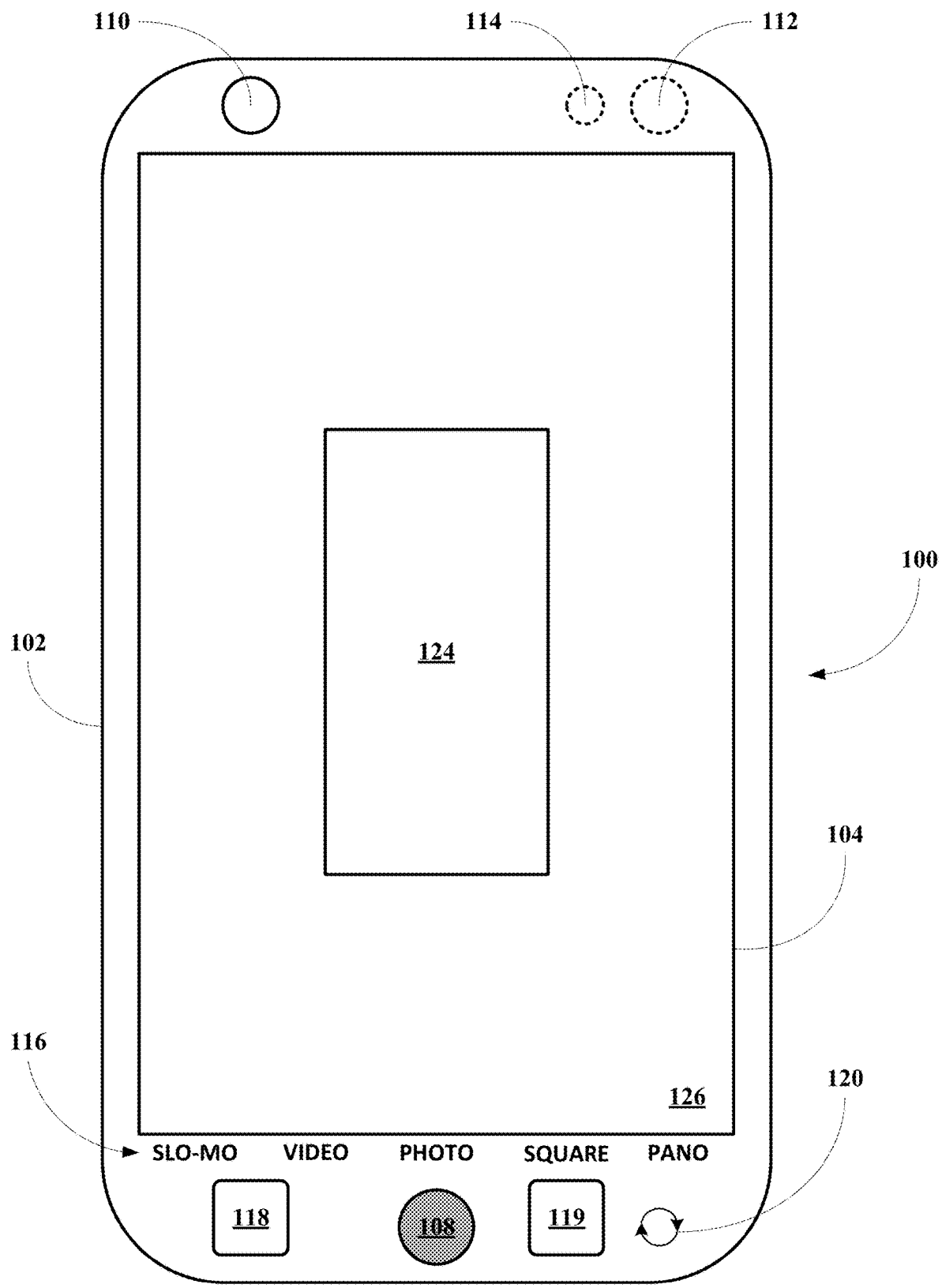
FIG. 1I depicts the mobile device of FIG. 1A showing capturing the embedded photo.

Referring now to FIG. 1I, now the button 108 is pressed capturing the photo displayed on the display 104.

Figure 1J:
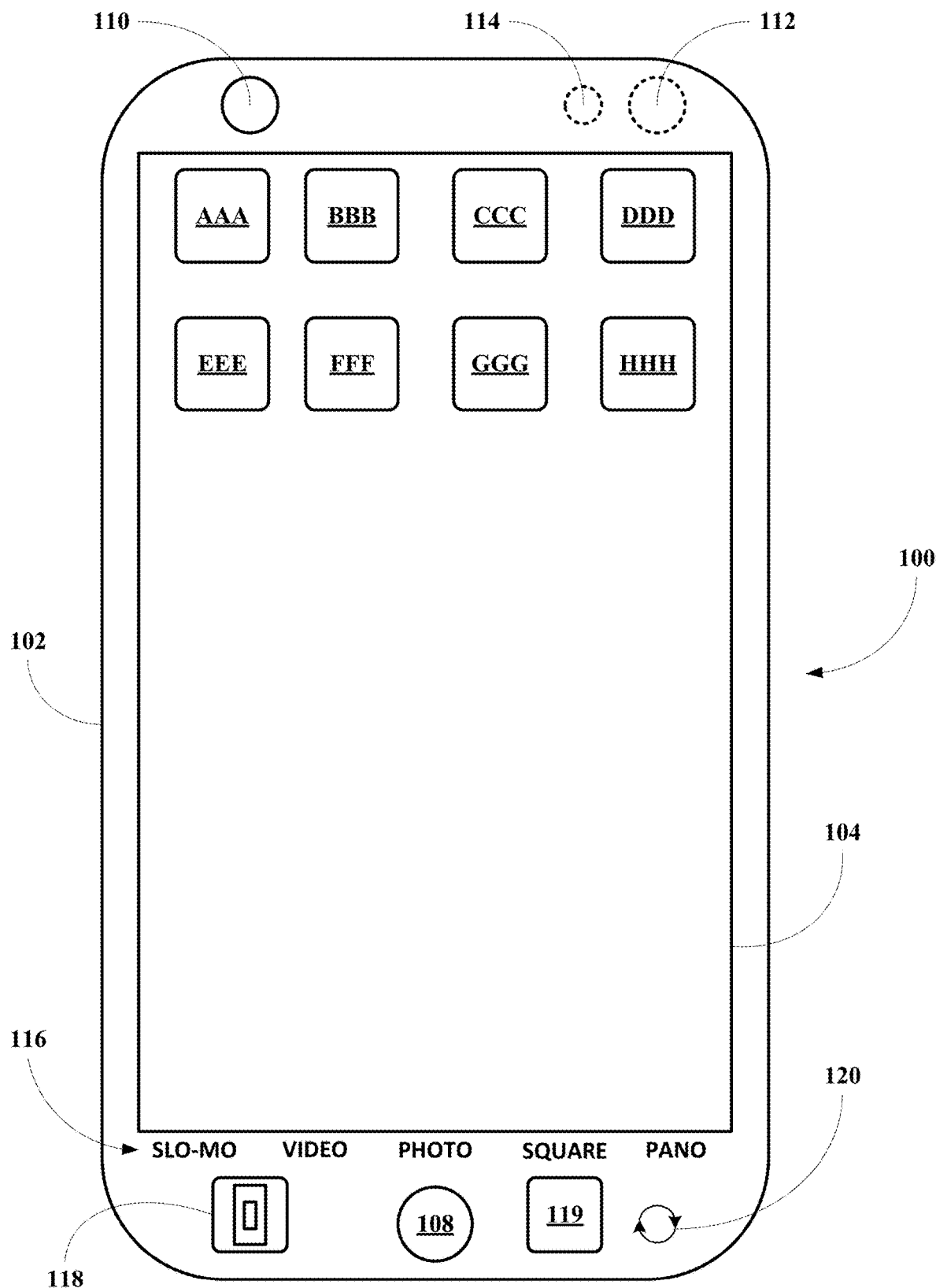
FIG. 1J depicts the mobile device of FIG. 1A resetting the screen including the selectable backgrounds, which may be the same or different, depending on a change in a location, surroundings, or environment.

Referring now to FIG. 1J, after capture, a thumbnail of the image is displayed in the field 118 and the display is returned to its state in FIG. 1D, wherein the background icons may be the same or different, shown here as icons AAA-EEE indicating that a location, a surroundings, or an environment captured by either the front facing or rear facing camera has changed.

It should be recognized that the motion may be associated with head or eye tracking devices in communication with the cell phone. Additionally, all selections may be confirmed by separate motion/movement by any input device or may a touch or voice command The order of displayed objects may also be changed as desired, so while looking at a trigger (marker) or other configured object or environment, the virtual or secondary image may be displayed and/or manipulated before bringing the person into view, and while looking at the persons image or any aspect, the elements may be manipulated or modified to adjust the final shot (captured image).

CLOSING PARAGRAPH OF THE DISCLOSURE

All references cited herein are incorporated by reference to the fully legally permitted usage. Although the disclosure has been disclosed with reference to its preferred embodiments, from reading this description those of skill in the art may appreciate changes and modification that may be made which do not depart from the scope and spirit of the disclosure as described above and claimed hereafter.

I claim:

1. A system comprising:
a mobile or wearable device comprising:
a motion sensor,
a front facing camera,
a display device,
a processing unit in communication with the motion sensor, the front facing camera, and the display device, and
the mobile or wearable device is configured to:
detect a first motion causing the mobile or wearable device to scroll through a set of icons;
detect a second motion, distinct from the first motion, causing the mobile or wearable device to select and activate an embedding application resident on the mobile or wearable device; and
point the mobile or wearable device at a surrounding; and
once activated, the embedding application is configured to:
activate the front facing camera;
capture surroundings image data, via the front facing camera, the surroundings image data including location data, surrounding data, environmental data, trigger data, or any combination thereof and a selfie or select one or more precaptured selfies from a plurality of precaptured selfies stored in an image database on the system and/or in a dedicated image database associated with the application, wherein the select occurs using motion based selection processing without invoking hard select processing;
generate a list of selectable backgrounds derived from the surrounding image data and display the list of selectable backgrounds;
select a particular selectable background from the list of selectable backgrounds, wherein the selection occurs using motion based select processing without invoking hard select processing;
remove selfie background data from the captured selfie or from the one or more precaptured selfies to form one or more processed selfies;
dynamically or manually embed the one or more processed selfies into or onto the particular selectable background; and
generate and store a resulting image in the image database and/or the dedicated image database.

2. The system of claim 1, wherein the application is further configured to:
prior to the select of the one or more precaptured selfies, retrieve a set of precaptured selfies from the image database or the dedicated image database;
display the plurality of precaptured selfies; and
scroll through the plurality of precaptured selfies using motion based select processing without invoking a hard select processing.

3. The system of claim 1, wherein the mobile or wearable device further comprising:
a speaker,
a microphone,
a feedback device, and
an input device.

4. The system of claim 3, wherein:
the motion sensor is selected from the group consisting of digital cameras, optical scanners, optical roller ball devices, touch pads, inductive pads, capacitive pads, holographic devices, laser tracking devices, thermal devices, EMF sensors, wave form sensors, arrays of such devices, and mixtures or combinations thereof,
the input device is selected from the group consisting of an eye tracking input device, a head tracking input device, a glove input device, a body suit input device, and combinations thereof, and
the feedback devices is selected from the group consisting of an eye tracking input device, a head tracking input device, a glove input device, a body suit input device, or other detached input device, a haptic device, a speaker, and combinations thereof.

5. The system of claim 1, wherein:
each of the selectable backgrounds comprising a real environment or a virtual environment derived from the surroundings image data and including background elements,
the background elements comprising one or more real-world persons, one or more virtual-world persons, one or more real-world things, one or more virtual things, one or more real-world animals, one or more virtual animals, one or more real-world plants, one or more virtual plants, one or more real-world objects, one or more virtual objects, or combinations thereof.

6. The system of claim 5, wherein the application is further configured to:
prior to the generate and store resulting image, manipulate the one or more processed selfies to form one or more manipulated selfies or one or more background elements to form one or more manipulated background elements and/or
dynamically embed the one or more processed selfies or the one or more manipulated selfies into or onto the particular selectable background including the one or more manipulated background elements based on the trigger data.

7. The system of claim 1, wherein:
the dynamically embed places the one or more processed selfies in the particular background based on the trigger data,
the manually embed allows a user to place the one or more processed selfies anywhere within the particular selectable background.

8. A mobile or wearable system comprising:
a front facing camera,
a rear facing camera,
a display device,
a motion sensor,
a speaker,
a microphone,
an input device,
a processing unit in communication with other components, and
the mobile or wearable system is configured to:
detect a first motion causing the mobile or wearable system to scroll through a set of icons;
detect a second motion, distinct from the first motion, causing the mobile or wearable system to select and activate an embedding application resident on the mobile or wearable device; and
point the mobile or wearable system at a surrounding; and
once activated, the embedding application is configured to:
activate the front facing camera, the rear facing camera, or both;
capture surroundings image information or data, via the front facing camera, the rear facing camera or both, the surroundings image data including location data, surrounding data, environmental data, trigger data, or any combination thereof and a selfie or select one or more precaptured selfies from a plurality of precapture selfies stored in an image database on the system or in a dedicated image database associated with the application, wherein the select occurs using motion based selection processing without invoking a hard select processing;

capture surroundings image information or data, via the front facing camera, the rear facing camera or both, the surroundings image data including environmental data, trigger data, or any combination thereof, generate a list of selectable backgrounds derived from the surrounding image data and display the list of selectable backgrounds;

select a particular selectable background from the list of selectable backgrounds using motion based selection processing without invoking hard select processing;

remove selfie background data from the captured selfie or the one or more precaptured selfies to form one or more processed selfies;

dynamically or manually embed the one or more processed selfies into or onto the particular selectable background; and generate and store a resulting image in the image database or in the dedicated image database.

9. The system of claim 8, wherein the application is further configured to:

prior to the select of the one or more precaptured selfies, retrieve a set of precaptured selfies from the image database or the dedicated image database;

display the precaptured selfies; and scroll through the precaptured selfies using motion based processing without invoking hard select processing.

10. The system of claim 9, wherein:

the motion sensor is selected from the group consisting of digital cameras, optical scanners, optical roller ball devices, touch pads, inductive pads, capacitive pads, holographic devices, laser tracking devices, thermal devices, EMF sensors, wave form sensors, arrays of such devices, and mixtures or combinations thereof, the input device is selected from the group consisting of an eye tracking input device, a head tracking input device, a glove input device, a body suit input device, and combinations thereof, and the feedback devices is selected from the group consisting of an eye tracking input device, a head tracking input device, a glove input device, a body suit input device, or other detached input device, a haptic device, a speaker, and combinations thereof.

11. The system of claim 8, wherein:

each of the selectable backgrounds comprising a real environment or a virtual environment derived from the surroundings data and including background elements, the background elements comprising one or more real-world persons, one or more virtual-world persons, one or more real-world things, one or more virtual things, one or more real-world animals, one or more virtual animals, one or more real-world plants, one or more virtual plants, one or more real-world objects, one or more virtual objects, or combinations thereof.

12. The system of claim 11, wherein the application is further configured to:

prior to the generate and store resulting image, manipulate the one or more processed selfies to form one or more manipulated selfies or one or more background elements to form one or more manipulated background elements and/or dynamically embed the one or more processed selfies or the one or more manipulated selfies into or onto the particular selectable background including the one or more manipulated background elements based on the trigger data.

13. The system of claim 8, wherein:

the dynamically embed places the processed selfies in the particular background based on the trigger data, the manually embed allows a user to place the one or more processed selfies anywhere within the particular selectable background.

14. A method implemented on a mobile or wearable device including a motion sensor, a front facing camera or a front facing camera and a rear facing camera, a display device, and a processing unit in communication with the other components, wherein the method comprising:

installing a selfie embedding application on the mobile or wearable device;

generating and displaying a selfie embedding application icon representing the selfie embedding application on the display device;

detecting a first motion causing the mobile or wearable devices to scroll through a set of icons;

detecting a second motion, distinct from the first motion, causing the mobile or wearable device to select and activate the selfie embedding application icon;

once the selfie embedding application is selected and activated:

pointing the mobile or wearable device at a surrounding;

activating the front facing camera or the front facing camera and the rear facing camera;

capturing surroundings image information or data, via the front facing camera, the rear facing camera or both, the surroundings image data including location data, surrounding data, environmental data, trigger data, or any combination thereof and a selfie or selecting one or more precaptured selfies from a plurality of precapture selfies stored in an image database on the system or in a dedicated image database associated with the application using motion based selection processing without invoking hard select processing;

removing background image data from the captured selfie or the one or more precaptured selfies to form one or more processed selfies;

generating a plurality of backgrounds derived from the surroundings image data and displaying the backgrounds as selectable background icons in on the display device;

selecting a particular selectable background icon from the selectable background icons using motion based processing without invoking a hard select processing;

embedding the one or more processed selfies into or onto the particular selectable background; and outputting and storing the image in the image database or in the dedicated image database.

15. The method of claim 13, further comprising:

prior to selecting one or more precaptured selfies, retrieving a set of precaptured selfies from the image database or the dedicated image database;

displaying the precaptured selfies; and scrolling through the precaptured selfies.

16. The method of claim 14, wherein:
each of the selectable backgrounds comprising a real environment or a virtual environment derived from the surroundings data and including background elements,
the background elements comprising one or more real-world persons, one or more virtual-world persons, one or more real-world things, one or more virtual things, one or more real-world animals, one or more virtual animals, one or more real-world plants, one or more virtual plants, one or more real-world objects, one or more virtual objects, or combinations thereof.

17. The method of claim 16, wherein, in the embedding step:
the one or more processed selfies are placed in the particular selectable background based on the trigger data.

18. The method of claim 16, further comprising:
prior to embedding, manipulating the one or more processed selfies to form one or more manipulated selfies or one or more background elements to form a modified background including the one or more manipulated background elements; and
embedding the one or more processed selfies or the one or more manipulated selfies into or onto the modified background.

19. The method of claim 14, wherein, in the installing step, the mobile device or wearable device further comprising:
a speaker,
a microphone, and
an input device.

20. The method of claim 19, wherein:
the motion sensor is selected from the group consisting of digital cameras, optical scanners, optical roller ball devices, touch pads, inductive pads, capacitive pads, holographic devices, laser tracking devices, thermal devices, EMF sensors, wave form sensors, arrays of such devices, and mixtures or combinations thereof,
the input device is selected from the group consisting of an eye tracking input device, a head tracking input device, a glove input device, a body suit input device, and combinations thereof, and
the feedback devices is selected from the group consisting of an eye tracking input device, a head tracking input device, a glove input device, a body suit input device, or other detached input device, a haptic device, a speaker, and combinations thereof.

* * * * *